Figure 1:
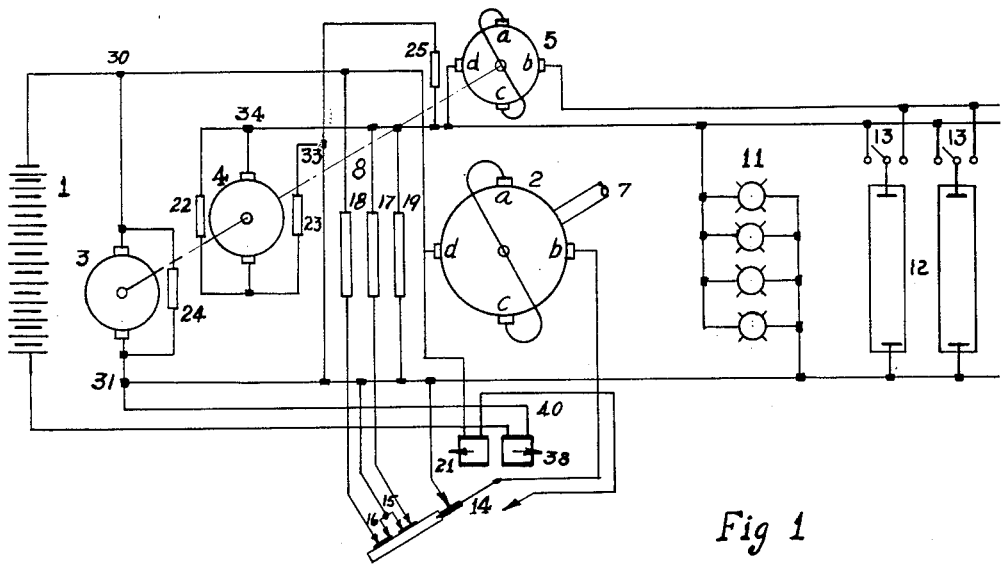

May 1, 1951  J. M. PESTARINI  2,551,459
TRAIN LIGHTING SET
Filed Nov. 20, 1946

INVENTOR

Patented May 1, 1951

2,551,459

UNITED STATES PATENT OFFICE 2,551,459

TRAIN LIGHTING SET

Joseph Maximus Pestarini, Staten Island, N. Y.

Application November 20, 1946, Serial No. 710,976

13 Claims. (Cl. 315—100)

The invention relates to a small power plant generally carried by the railway coaches for illuminating the coach itself; the prime mover is usually the axle of the wheels which rotates at a variable speed in one and in the opposite direction; when the coach runs at low speed a battery of accumulators supplies the electrical power; at the speed, hereinafter termed "transitional speed," under which the generator coupled with the axle can no longer supply sufficient power for lighting, a switch automatically transfers the load from the battery to the axle generators or reversely.

A first purpose of this invention consists in the creation of constant voltage whatever may be the speed of the axle; the voltage created oscillates generally around the desired value, the smaller the oscillation the better the system because the illumination becomes more stable and the life of the lamps results longer.

Usually the battery is charged in the stations when the coaches are at rest by means of a central plant for charging the battery installed in the most important railway stations. A second purpose of this invention is the charging of the battery while the speed of the coach exceeds the transitional speed, the charging being obtained with an adequate current vanishing automatically when the battery reaches its full voltage.

When the speed of the coach is lower than the transitional one or when the coach is at rest, the lamps are submitted to the voltage of the battery which varies according to its state of discharge. A third purpose of this invention is the feeding of the lamps with a constant voltage even when the speed of the coach is lower than the transitional speed, or when the coach is at standstill independently from the voltage of the battery.

Further, the invention discloses means for illuminating the coach with fluorescent lamps or with fluorescent lamps and usual filament lamps simultaneously, the peak of voltage necessary for building up the fluorescent lamps being provided, without troubling the constant normal voltage supplying the lamps already lit.

Finally the invention discloses means for controlling the transition switch from the battery to the axle generator supply and the reverse.

The invention consists essentially: in the arrangement of S generator metadynes driven by the axle and charging the battery by its secondary brushes, the secondary current of the said metadyne being controlled, independently from the value and the direction of the speed, by the voltage of the battery; the intensity of the secondary current is reasonably high when the battery is discharged and drooping gradually down to zero when the voltage of the battery reaches the value corresponding to a complete charge, the direction of the said secondary current being independent from the rotational direction of the axle; further in the arrangement of a rotating auxiliary group, hereinafter termed "filter group," permanently connected to the battery, and therefore connected to the secondary brushes of the S generator metadyne when the speed is higher than the transitional one, rotating at a constant speed and feeding directly or indirectly the consumers; finally in the arrangement of an auxiliary metadyne driven by the filter group and supplying the peak of voltage necessary for the building up of the fluorescent lamps.

The constancy of the speed of rotation of the filter group is essential for obtaining the constant voltage feeding the lamps and this, according to the invention, is obtained by an electrical machine fed by the battery supplying a variable voltage but having its magnetic field proportional to the said voltage of the battery.

The filter group creates, by an auxiliary generator, either the total voltage impressed upon the lamps, or the difference of the voltage between the desired voltage to be supplied to the lamps and the battery voltage.

The motor and the auxiliary generator of the filter group may be obtained, according to the invention, either by separate dynamos or by a single metadyne.

The invention will be easily understood by following the description of some particular cases, reference being made to the accompanying figures.

Figures 3, 4, 4A:
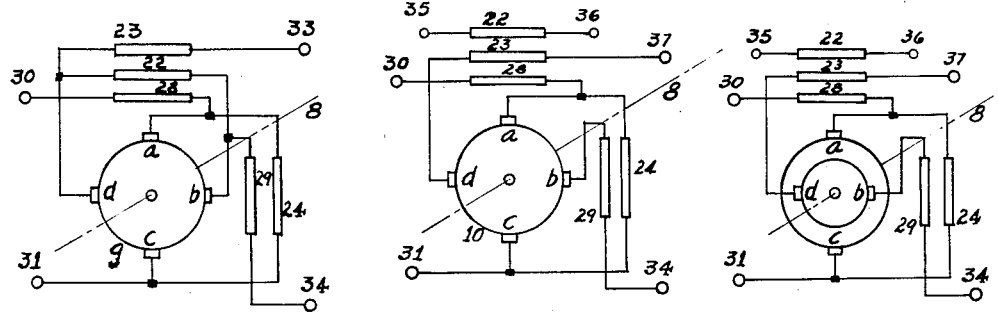
Figure 2:
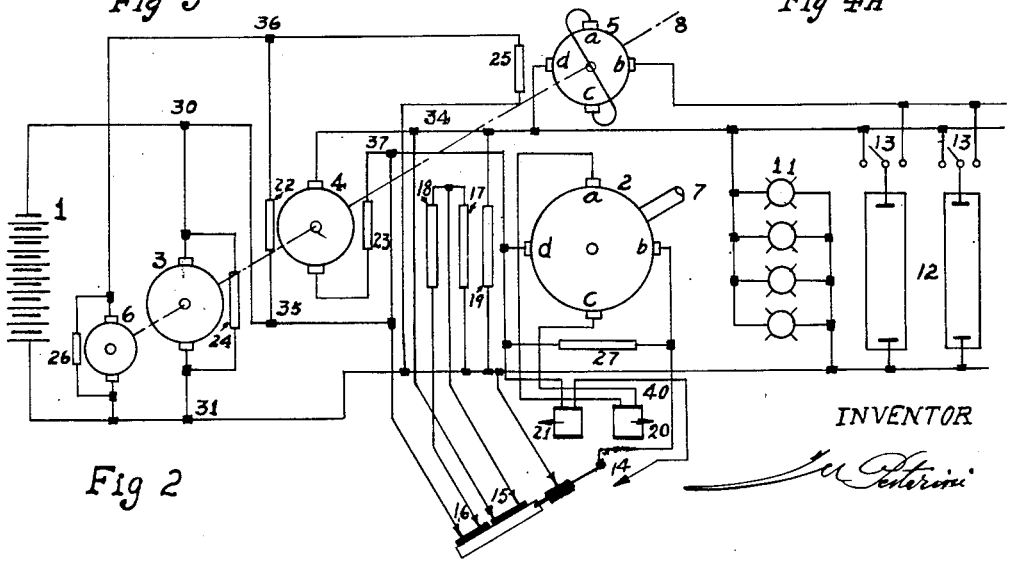

Figure 1 shows a complete scheme of the plant where the motor and the auxiliary generator of the filter group are dynamos, the auxiliary generator supplying the total voltage to the lamps; Figure 2 shows a variant with the auxiliary generator supplying only the difference between the voltage of the lamps and the battery voltage; Figure 3 shows a scheme of a metadyne of the filter group operating simultaneously as motor and as constant voltage auxiliary generator; Figure 4 and Figure 4A show a scheme of a metadyne being able to operate simultaneously as motor and as generator of the difference between the voltage of the lamps and the battery voltage.

The metadyne, here often mentioned, is an electric direct current machine having more than two brushes per cycle, the flux created by the current traversing the armature through a pair of brushes inducing an electromotive force between the brushes of another pair of the same cycle.

The metadyne has been described in many United States patents of the same inventor, see for instance, Patents Nos. 2,055,240; 1,987,417; 2,038,380; 2,049,389; and 2,079,465. A more complete description has been given in Revue Generale de l'Electricite, on March 8 and 15, August 16 and 23, November 22 and 29 and December 6, 1930, Paris.

The above mentioned S generator metadyne has four equidistant brushes per cycle, say $a$, $b$, $c$ and $d$, the two brushes $a$ and $c$, called primary brushes, being short circuited and the two brushes $b$ and $d$, called secondary brushes, being connected to the consumer; the machine is provided with a stator winding having its magnetic axis along the commutating axis of the secondary brushes; this winding, called secondary stator winding, controls by its ampere-turns the value of the intensity of the secondary current supplied by the S generator metadyne, and it may be composed of many members, called members of the secondary stator winding. The S generator metadyne has been described in its variant forms in many previous patents of the same inventor, for instance, the United States patent entitled "Control of the Excitation of Electrical Machines," patented September 28, 1937, under Number 2,094,492.

The above mentioned auxiliary metadyne for creating the peak of voltage for the building up of the fluorescent lamps is described in the United States patent by the same inventor, entitled "Fluorescent Lamps Fed by Direct Current," filed November 20, 1946, under Serial Number 710,975, now Patent No. 2,484,246, issued Oct. 11, 1948.

Figure 1 shows the battery indicated by the numeral 1; the main S generator metadyne indicated by 2 is shown coupled on the axle 7 supposed rotating at variable speed; the filter group, the shaft of which is indicated by 8, comprises three machines, a shunt unsaturated motor 3, a compound excited generator dynamo 4 and an auxiliary metadyne 5 for the peak of voltage for the fluorescent lamps 12. When the coach runs at a speed higher than the transitional speed, the switch 14 is brought automatically to its left position and the contacts 15 and 16 are closed. In this case, the main S generator metadyne 2 has its secondary brushes $b$ and $d$ connected to the battery while its primary brushes $a$ and $c$ are permanently short circuited. The secondary current of the S generator metadyne 2 is controlled by the ampere turns of the three members 17, 18 and 19 of its secondary stator windings.

The unsaturated shunt excited motor 3 fed by the battery across its terminals 30 and 31, rotates on its shaft 8 at constant speed because the field created by the shunt connected field winding 24 is proportional at any moment to the variable voltage of the battery. The auxiliary generator dynamo 4 creates a constant voltage and is provided with two field windings 22 and 23, the field winding 22 shunt connected across the brushes of the dynamo creates a constant electromotive force while the series field winding 23, creating an electromotive force in the same sense as the supplied current, allows for the compensation of the ohmic drop. Thus the auxiliary generator dynamo 4 supplies a voltage accurately kept constant to its terminals 33 and 34 and therefrom to the filament lamps 11 and to the fluorescent lamps 12.

The auxiliary metadyne 5 creating the building up voltage for the fluorescent lamps is shown on Figure 1 supplying a complementary voltage above the voltage created by the auxiliary generator dynamo 4 and has its secondary current controlled by the secondary stator winding 25 shunt connected across the constant voltage supplied to the consumers. The fluorescent lamps are submitted to the sum of the voltage due to the auxiliary generator dynamo 4 and to the secondary voltage of the auxiliary metadyne 5 when the switch 13 is brought to its right position allowing thus for the building up of the electronic column; when the switch 13 is brought to its left position the fluorescent lamps are submitted to the constant voltage supplied by the auxiliary generator dynamo 4. Instead of the auxiliary metadyne 5 represented on Figure 1 with the connections of a generator, one may adopt any other metadyne as described in the above mentioned patent, entitled "Improvements on Fluorescent Lamps Fed by Direct Current."

The member 17 of the secondary stator winding of the main S generator metadyne 2 is shunt connected across the constant voltage supplied to the consumers, the contact 15 being closed; thus it creates a constant value of ampere turns. The member 18 is shunt connected across the battery voltage; finally the member 19 is permanently shunt connected across the voltage created by the auxiliary generator dynamo 4. The connections of the three members are such that, the ampere turns created by the members 17 and 19 have the same direction while the ampere turns created by the member 18 have the opposite direction; the resultant ampere turns of all three members being equal to the necessary one for creating between the brushes $b$ and $d$ the voltage that the battery reaches when it is completely loaded with a secondary current practically nil. Therefore the secondary current of the generator metadyne 2 supplied for charging the battery will be reasonably intense when the battery is discharged and it will drop gradually to zero when the battery is fully charged and this happens whatever may be the speed except for slight differences, the charging current being slightly more intense when the speed of the axle 7 is high.

When the speed is lower than the transitional speed and particularly when the coach is at rest, the switch 14 is supposed automatically brought to its right position while the contacts 15 and 16 are supposed open. Then the secondary brush $b$ of the S generator metadyne 2 is disconnected from the battery but the consumers 11 and 12 are regularly fed by the auxiliary generator dynamo 4.

For switching on or off simultaneously the switch 14 and the contacts 15 and 16, any mechanical device may be used, operating under the action of the centrifugal force in the very well known manner.

The said switch, which has two positions only, a first one at left, corresponding to speeds higher than the transitional one and a second one, at right, corresponding to lower speeds, may be operated also, according to this invention, by an electrical relay 40 having two windings, a first winding 21 connected across the secondary brushes $b$ and $d$ of the main S generator metadyne and a second winding 38 traversed by the current charging the battery. When starting from rest the speed of the axle 7 gradually increases, the small amount of ampere turns given by the member 19 creates between the secondary brushes $b$ and $d$ an electromotive force increasing quicker than the speed of the axle 7, and when the transitional speed is reached, the above mentioned winding 21 of the relay suffices for bringing the switch at its first position, at left; when the speed of the axle 7 slows down and approaches the transitional speed, the voltage created between the brushes $b$ and $d$ becomes insufficient for giving a charging current; the curren then tends to invert its direction creating thus in the winding 38 of the relay 40 ampere turns antagonistic to the one created by the winding 21 of the relay and the switch is tripped to its second position at right.

A further process to trip the said switch is, according to the invention, obtained by two relays indicated by the numerals 20 and 21 on the scheme of Figure 2. When the speed of the axle 7 slows down and approaches the transitional speed, the main S generator metadyne becomes saturated and the primary current supplied by the brushes $a$ and $c$ and traversing the winding of the relay 20, increases rapidly, energizes the relay and trips the switch to its second position. When starting from rest the axle 7 speeds up and approaches the transitional speed, the relay 21, connected to the secondary brushes $b$ and $d$, the switch 14 being at its left position, is traversed by a current increasing more rapidly than the speed and it trips the switch to its first position at the value of the speed slightly higher than the transitional one. The relay 21 trips the switch at a speed preferably higher than the speed at which the relay 20 acts in order to avoid hunting of the switch.

In Figure 1 the small S generator metadyne 5 is shown for building up the fluorescent lamps by creating a peak voltage added to the constant voltage created by the auxiliary dynamo 4; but any other device in the patent by the same inventor, entitled "Improvements on Fluorescent Lamps Fed by Direct Current" filed November 20, 1946, under Serial Number 710,975, may be adopted.

In Figure 2 the scheme of a variant is indicated; the same elements on all drawings here attached are indicated by the same numerals and therefore it is not necessary to repeat the significance of all numerals for each figure.

The scheme of Figure 2 differs from the scheme of Figure 1 substantially for the arrangement of the "filter group." The latter comprises now four separate machines, the shunt excited unsaturated motor 3 connected to the battery 1 at its terminals 30 and 31; the auxiliary metadyne 5 for the building up of the fluorescent lamps 12; a first auxiliary generator dynamo 4 creating a voltage at its terminals 37 and 34 added to the battery voltage for supplying constant voltage to the consumers 11 and 12, and a second auxiliary dynamo 6 shunt excited through the field winding 26 and creating a constant voltage equal to the voltage to be supplied to the consumers.

The first auxiliary generator dynamo 4 creates a voltage equal to the difference of the constant voltage supplied to the consumers and the battery voltage; for that purpose it is excited by the field winding 22 fed through its terminals 35 and 36 by the difference of the constant voltage created by the second auxiliary generator dynamo 6 and the battery voltage; the auxiliary generator dynamo 4 is provided also with a series field winding 23 allowing for the compensation of the ohmic drop. It is thus apparent that the filter group must now supply only a part of the load to the consumers, part proportionate to the difference of the voltage between the constant voltage supplied to the consumer and the battery voltage; therefore the filter group although it has four machines, is lighter than the filter group of the scheme of Figure 1.

The main S generator metadyne 2 has a secondary variator winding comprising three members: a first member 19 permanently shunt connected across the line supplying current to the consumers, and creating a small amount of ampere turns necesary for an energizing of the relay 21 as explained in the description of Figure 1; a second member 17 and a third one 18 connected only through the contacts 16 and 17 when the variable speed of the shaft 7 is higher than the transitional speed; the member 17 is shunt connected across the line supplying constant voltage to the consumer while the member 18 is fed by the difference of the voltage between the constant voltage supplied to the line feeding the consumers and the battery voltage. Thus the ampere turns created by the two members 18 and 17 have the same direction when the battery voltage is lower than the said line voltage; the said ampere turns are opposed, on the contrary, when the battery voltage is higher than the line voltage. Finally, when the charge of the battery is complete, the resultant ampere turns of the global secondary stator winding comprising the three members 17, 18 and 19 allow for the creation of a secondary voltage between the secondary brushes $b$ and $d$ equal to the maximum voltage reached by the battery completely charged and for a secondary current equal to nil. It is apparent that the copper weight of the secondary stator windings relative to the scheme of Figure 2 is less than the copper weight corresponding to the secondary stator winding of the scheme of Figure 1.

In Figure 2 the main S generator metadyne 2 is shown provided with a primary stator winding 27 allowing for a reduction of the primary current flowing between the primary brushes $a$ and $c$, reducing thus the copper losses in the main S generator metadyne.

Figures 3 and 4 refer to a further purpose of the invention, which involves the reduction of the number of the dynamos of the filter group, any pair of dynamos being replaced by a metadyne supplying the same currents as the replaced dynamos. Thus the scheme of Figure 3 corresponds to a metadyne replacing two dynamos, one of which is the motor 3 and the other is either the auxiliary generator dynamo 4 of the scheme of Figure 1 creating a constant voltage or the second auxiliary generator dynamo 6 of the scheme of Figure 2.

The metadyne 9 has four brushes $a$, $b$, $c$ and $d$; the primary brushes $a$ and $c$, being connected to the battery through their terminals 30 and 31 corresponding to the terminals indicated by the same numerals on Figures 1 and 2. The secondary brushes $b$ and $d$, are shown connected to the terminals 33 and 34 of the scheme of Figure 1.

The metadyne 9 is provided with two compensating windings 28 and 29 for the complete compensation of the armature ampere turns due to the primary and the secondary current traversing the brushes $a$ and $c$ and the brushes $b$ and $d$ respectively; thus none of the said currents has any action upon the other.

The metadyne 9 is provided with the member 22 of the primary stator winding allowing for the creation of constant voltage between the brushes $b$ and $d$; and the member 23 of the primary stator winding allowing for the compensation of the ohmic drop created by the secondary current. Finally the said metadyne 9 is provided with the member 24 of its secondary stator winding shunt connected across the primary brushes $a$ and $c$ and creating between the said brushes any value of the voltage of the battery whatever may be its state of charge. The members 22, 23, and 24 of the stator windings of the metadyne 9, correspond, therefore, to the field windings indicated by the same numerals on Figure 1. For obtaining a constant speed of the shaft 8 in spite of the voltage variations of the battery, the magnetic circuit of the metadyne 9 as it is traversed by the secondary flux, having its axis along the commutating axis of the secondary brushes $b$ and $d$, is unsaturated.

The above described metadyne of Figure 3 may thus replace the two dynamos 4 and 3 of the scheme of Figure 1; in this case the battery and the constant voltage network will not have a common terminal. Such a metadyne may, in the same way, be substituted for the two dynamos 3 and 6 of the scheme of Figure 2.

Figure 4 shows a metadyne 10 able to replace the two dynamos 3 and 4 of the scheme of Figure 2. The primary brushes $a$ and $c$ are connected to the battery by the terminals 30 and 31. The secondary brushes $b$ and $d$ are connected to the terminals 34 and 37 indicated by the same numerals on Figure 2. The said metadyne 10 bears a primary and a secondary compensating winding 28 and 29 for a complete compensation of the armature ampere turns; it bears further a secondary stator winding 24, shunt connected across the primary brushes $a$ and $c$, able to create ampere turns for inducing between the primary brushes any value of the voltage of the battery whatever may be the state of charge of the latter, the secondary flux being supposed traversing a completely unsaturated magnetic circuit. The said metadyne 10 is further provided with a member 22 of its primary stator winding connected between the terminals 35 and 36 indicated by the same numerals on Figure 2 and allowing for a feeding of the said stator winding by a voltage equal to the difference of the voltage, created by the second auxiliary generator dynamo 6, equal to the voltage supplied to the consumer, and the battery voltage; and finally it is provided with the member 23 traversed by the secondary current and having its magnetic axis along its commutating axis of the primary brushes and allowing for a compensation of the ohmic drop due to the secondary current; in this case the armature has preferably two windings, one winding cooperating with the brushes $a$ and $c$, the other winding cooperating with the brushes $b$ and $d$ as Figure 4A shows.

A metadyne having identical connections as the one shown in Figure 4A may replace the two dynamos 4 and 6 of the scheme of Figure 2.

Minor variations may be brought on the scheme above described yet still within keeping of the same lines disclosed by the invention.

The small power plant is described above as pertaining to a railway coach, but it may be used in any other case where the prime mover runs at a variable speed.

I claim:

1. An electric power plant comprising a battery, a generator metadyne adapted to be driven at a variable speed, said metadyne comprising an armature provided with a pair of short circuited primary brushes and a pair of secondary brushes per cycle, said pair of secondary brushes being connected to said battery, and a plurality of stator windings controlling the current supplied by said generator metadyne through its secondary brushes and a direct current constant voltage device, a circuit including said battery, a circuit including one of said stator windings, said circuits being related whereby the current traversing said one stator winding varies with the battery voltage, means for connecting another of said stator windings to said constant voltage device whereby the resultant ampere turns of said stator windings are reduced when the battery voltage increases and the current supplied by said metadyne to the battery and controlled by said resultant ampere turns approaches zero when the battery voltage reaches its maximum value during the battery charging.

2. An electric power system comprising a battery, a generator metadyne adapted to be operated at a variable speed, said metadyne comprising a plurality of control windings, an armature provided with a pair of short circuited primary brushes and a pair of secondary brushes per cycle, means for providing a constant voltage direct current and a load circuit, said metadyne supplying current to said battery and energizing said load circuit, one of said control windings being energized by said constant voltage means for creating constant ampere turns in said winding, another of said control windings being energized by said battery for creating ampere turns varying with the voltage of said battery, whereby the resultant ampere turns of said control windings are reduced when the battery voltage increases and the current supplied by the generator metadyne to the battery and controlled by said resultant ampere turns, approaches zero when the battery voltage reaches its maximum voltage.

3. An electric power plant comprising a battery, a generator metadyne adapted to be driven at a variable speed, said metadyne comprising an armature provided with a pair of short circuited primary brushes and a pair of secondary brushes per cycle, said pair of secondary brushes being connected to said battery, and a plurality of stator windings controlling the current supplied by said generator metadyne through its secondary brushes, a load circuit and a motor generator comprising a pair of brushes, connected to said battery, a shunt field winding for creating a flux, through an unsaturated magnetic circuit, inducing an electromotive force between said brushes, a second pair of brushes for supplying output current at a substantially constant voltage to said load circuit, means for connecting one of said stator windings of said generator metadyne to said load circuit, means for connecting another of said stator windings to said constant voltage device whereby the resultant ampere turns of said stator windings are reduced when the battery voltage increases and the current supplied by said metadyne to the battery and controlled by said resultant ampere turns approaches zero when the battery voltage reaches its maximum value during the battery charging.

4. An electric power system comprising a battery, a generator metadyne operating at a variable speed including a plurality of control windings and an armature associated with a pair of short circuited primary brushes and a pair of secondary brushes per cycle, said pairs of brushes being displaced relative to each other, a load circuit, a motor operating at constant speed energized by said battery and provided with a shunt field winding creating a flux in an unsaturated magnetic circuit inducing in said motor an electromotive force balancing the voltage of the battery, a constant voltage generator driven by said motor, a variable voltage generator driven by said motor supplying said load circuit with an electromotive force equal to the difference between the voltage of said constant voltage generator and the voltage of said battery, means for connecting said secondary brushes of said generator metadyne to the battery, means for connecting one of said control windings to said variable voltage generator, means for connecting another of said control windings to said constant voltage generator, whereby the resultant ampere turns of said control windings of said generator metadyne are reduced when the battery voltage increases and the current supplied by said metadyne to said battery and controlled by said resultant ampere turns, approaches zero when the battery charging voltage reaches its maximum value, means for connecting in series said battery and said variable voltage generator to said load circuit whereby said circuit is supplied with constant voltage.

5. An electric power system comprising a battery, a generator metadyne operating at a variable speed including a plurality of control windings and an armature associated with a pair of short circuited primary brushes and a pair of secondary brushes per cycle, said pairs of brushes being displaced relative to each other, a load circuit, a motor operating at constant speed, a constant voltage generator driven by said motor, a variable voltage generator driven by said motor supplying said load circuit with an electromotive force equal to the difference between the voltage of said constant voltage generator and the voltage of said battery, means for connecting said secondary brushes of said generator metadyne to the battery, means for connecting one of said control windings to said variable voltage generator, means for connecting another of said control windings to said constant voltage generator, whereby the resultant ampere turns of said control windings of said generator metadyne are reduced when the battery voltage increases and the current supplied by said metadyne to said battery and controlled by said resultant ampere turns, approaches zero when the battery charging voltage reaches its maximum value, means for connecting in series said battery and said variable voltage generator to said load circuit whereby said circuit is supplied with constant voltage.

6. A system as in claim 3 wherein said constant voltage means comprise an auxiliary metadyne including an armature provided with a pair of primary brushes connected to the battery and a pair of secondary brushes displaced from said primary brushes and connected to the load circuit and a plurality of stator windings, one of said stator windings compensating the ampere turns created by the current traversing the armature of said auxiliary metadyne through its primary brushes, a second of said stator windings compensating the ampere turns created by the current traversing the armature of said auxiliary metadyne through its secondary brushes, a third of said stator windings being shunt connected across the primary brushes of said auxiliary metadyne and inducing a voltage between the primary brushes of said auxiliary metadyne through an unsaturated magnetic circuit, a fourth of said stator windings shunt connected across the secondary brushes of said auxiliary metadyne and inducing a constant voltage between said secondary brushes, and a fifth stator winding traversed by the current traversing the armature through said secondary brushes and creating between said secondary brushes a voltage compensating the ohmic drop in said auxiliary metadyne.

7. An electric power system comprising a battery, a generator metadyne operating at a variable speed including a plurality of control windings and an armature associated with a pair of short circuited primary brushes and a pair of secondary brushes per cycle, said pairs of brushes being displaced relative to each other, a load circuit, an auxiliary metadyne including an armature provided with a pair of primary brushes connected to the battery and a pair of secondary brushes displaced from said primary brushes and a plurality of stator windings, one of said stator windings compensating the ampere turns created by the current traversing the armature of said auxiliary metadyne through its primary brushes, a second of said stator windings compensating the ampere turns created by the current traversing the armature of said auxiliary metadyne through its secondary brushes, a third of said stator windings being shunt connected across the primary brushes of said auxiliary metadyne and inducing a voltage between the primary brushes of said auxiliary metadyne through an unsaturated magnetic circuit, a fourth of said stator windings shunt connected across the secondary brushes of said auxiliary metadyne and inducing a constant voltage between said secondary brushes, a fifth stator winding traversed by the current traversing the armature through said secondary brushes and creating between said secondary brushes a voltage compensating the ohmic drop in said auxiliary metadyne, a variable voltage generator driven by said auxiliary metadyne supplying said load circuit with an electromotive force equal to the difference between the voltage of said constant voltage generator and the voltage of said battery, means for connecting said secondary brushes of said generator metadyne to the battery, means for connecting one of said control windings to said variable voltage generator, means for connecting another of said control windings to the secondary brushes of said auxiliary metadyne, whereby the resultant ampere turns of said control windings of said generator metadyne are reduced when the battery voltage increases and the current supplied by said metadyne to said battery and controlled by said resultant ampere turns, approaches zero when the battery charging voltage reaches its maximum value, means for connecting in series said battery and said variable voltage generator to said load circuit whereby said circuit is supplied with constant voltage.

8. An electric power system comprising a battery, a generator metadyne operating at a variable speed including a plurality of control windings and an armature associated with a pair of short circuited primary brushes and a pair of secondary brushes per cycle, said pairs of brushes being displaced relative to each other, a load circuit, an auxiliary metadyne including an armature provided with two separate windings, one winding associated with a pair of primary brushes connected to the battery and another winding associated with a pair of secondary brushes displaced from said primary brushes and a plurality of stator windings, one of said stator windings compensating the ampere turns created by the current traversing the armature of said auxiliary metadyne through its primary brushes, a second of said stator windings compensating the ampere turns created by the current traversing the armature of said auxiliary metadyne through its secondary brushes, a third of said stator windings being shunt connected across the primary brushes of said auxiliary metadyne and inducing a voltage between the primary brushes of said auxiliary metadyne through an unsaturated magnetic circuit and a constant voltage generator, means for connecting said secondary brushes of said generator metadyne to the battery, means for energizing a fourth of said stator windings of said auxiliary generator metadyne with the difference of voltage between the voltage created by said constant voltage generator and the voltage of said battery, said fourth stator winding inducing an electromotive force between the secondary brushes of said auxiliary metadyne, means for energizing one of said control windings of said generator metadyne with the difference of voltage between the voltage of said constant voltage generator and the voltage of the battery, means for connecting another of said control windings to said constant voltage generator, whereby the resultant ampere turns of said control windings of said generator metadyne are reduced when the battery voltage increases and the current supplied by said generator metadyne to said battery and controlled by said resultant ampere turns, approaches zero when the battery charging voltage reaches its maximum value, means for connecting in series said battery and said secondary brushes of said auxiliary metadyne, to said load circuit whereby said load circuit is supplied with constant voltage.

9. A system as in claim 2 and further including means for disconnecting said generator metadyne from the battery at a predetermined speed of said metadyne and reconnecting said generator metadyne and battery at another predetermined speed.

10. A system as in claim 9, wherein said disconnecting means comprises a switch and a relay in circuit with said battery for operating said switch when the battery tends to supply current to said generator metadyne.

11. A system as in claim 9, wherein said disconnecting means comprise a switch and a relay operating said switch, said relay being traversed by a current supplied by said generator metadyne through its primary brushes and being operative when said last mentioned current reaches a predetermined value.

12. A system as in claim 9, wherein said reconnecting means comprise a switch, a relay shunt connected across the secondary brushes of said generator metadyne and adapted to operate said switch when the voltage induced between the secondary brushes of said generator metadyne reaches a predetermined voltage and an exciting coil energized by said constant voltage device for said generator metadyne.

13. A system as in claim 2 wherein said load circuit comprises fluorescent lamps and means for creating peak voltage for initiating the operation of said lamps.

JOSEPH MAXIMUS PESTARINI.

REFERENCES CITED

The following references are of record in the file of this patent:

UNITED STATES PATENTS

| Number | Name | Date |
|---|---|---|
| 2,049,388 | Pestarini | July 28, 1936 |
| 2,072,768 | Pestarini | Mar. 2, 1937 |